Jan. 7, 1936. C. DE L. RICE 2,026,997
UNIVERSAL JOINT
Filed Feb. 9, 1934
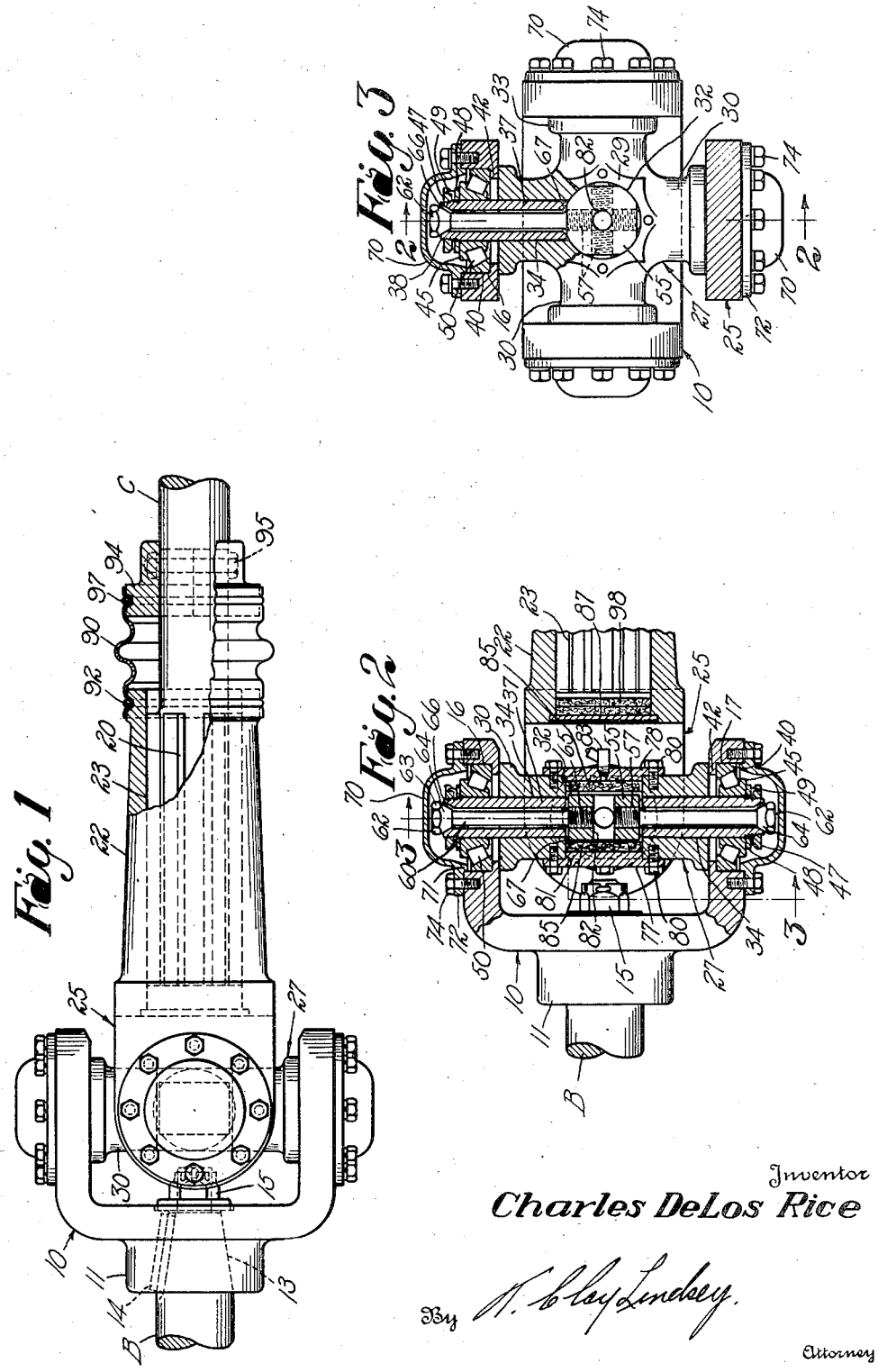
Inventor
*Charles DeLos Rice*
By *N. Clay Lindsey.*
Attorney Patented Jan. 7, 1936

2,026,997

UNITED STATES PATENT OFFICE 2,026,997

UNIVERSAL JOINT

Charles De Los Rice, West Hartford, Conn.

Application February 9, 1934, Serial No. 710,467

5 Claims. (Cl. 64—17)

This invention relates to improvements in universal joints, and has for its principal object the provision of a universal joint in which both the driving and the centrifugal stresses are carried by antifriction bearings and in which the stresses on the bearings themselves are thoroughly equalized.

A further object resides in the provision of a universal joint of the character described which is easy to assemble and which is so sturdily constructed that it will not readily get out of order in use.

A still further object resides in the provision of a universal joint of the character described which is economical to manufacture and which is fully adjustable to provide for the proper working fit of the moving parts and to take up wear.

Other objects and advantages will appear as the description proceeds.

In the accompanying drawing in which like reference characters have been used to designate corresponding parts throughout, I have illustrated a suitable mechanical embodiment of the idea of the invention. The drawing, however, is for the purpose of illustration only and is not to be taken as limiting the invention the scope of which is to be measured entirely by the scope of the subjoined claims.

In the drawing,

Fig. 1 is an elevational view of a universal joint constructed according to the idea of this invention, a portion thereof being broken away to better illustrate the construction of the same;

Fig. 2 is a vertical sectional view of the universal joint on the line 2—2 of Fig. 3; and Fig. 3 is a sectional view of the universal joint taken on the line 3—3 of Fig. 2.

Referring to the drawing in detail, and particularly to Fig. 1, it will be observed that I have provided a universal joint connecting rotatable shafts B and C. For the purpose of this illustration, the shaft B may be considered the driving shaft, and the shaft C the driven or propeller shaft. Upon the drive shaft B, I have provided a substantially U-shaped yoke generally indicated at 10. The base of this yoke 10 is provided with an apertured boss 11 by means of which the yoke is rigidly secured upon the tapered end 13 of the drive shaft B, the yoke being secured against rotation by the key 14 and maintained against movement axially of the shaft by the lock nut 15 threaded upon the reduced end of the shaft B. The legs of the yoke are provided with registering apertures 16 and 17 particularly illustrated in Fig. 2.

The driven shaft C is provided along the end portion thereof adjacent to the universal joint with longitudinally extending grooves 20, and a sleeve member 22, having corresponding grooves 23 internally thereof, is slidably, but non-rotatably, mounted upon the end portion of the driven shaft C to provide a Cardan shaft connection between the driven shaft and the sleeve. This sleeve 22 is provided at one end thereof with an integral U-shaped yoke 25 having the leg portions thereof provided with registering apertures similar to the apertures 16 and 17 in the yoke 10. The yokes 10 and 25 are adapted to be positioned at right angles to each other, as illustrated in Figs. 1 and 3, and between these yokes I have provided a spider member, generally indicated at 27, in the form of a forging having a hub portion, as indicated at 29, and four cylindrical spokes or extensions, as indicated at 30, extending from the hub portion and disposed at right angles to each other. The hub portion 29 of the spider 27 is provided with a transverse aperture 32, and each of the spoke portions 30 is provided with a longitudinal bore or aperture, as indicated at 34, leading from the outer end of the extension 30 into the central transverse aperture 32. Each of the extensions 30 is also provided, adjacent to its outer end, with a radially extending annular flange, as indicated at 33. The spider 27 is of such dimensions that the oppositely extending spokes or extensions 30 thereof fit closely within the respective yokes 10 and 25, as illustrated in Fig. 3. In order to rotatably secure the legs of the yokes 10 and 25 to the spokes 30 of the spider member 27, I have provided the following construction: a tubular member as indicated at 37 in Figs. 2 and 3 extends through the aperture such as 16 or 17 in each leg of each yoke member and through the bore 34 in the corresponding extension 30 of the spider member and terminates at the periphery of the circular transverse aperture 32, the outer ends of these tubular members 37 being screw threaded as indicated at 38. An antifriction bearing is disposed between the outer end of each of these tubular members and the respective leg of the yoke, the outer race of such bearing as indicated at 40 being disposed within the aperture in the leg of the yoke and maintained therein by an underlying annular flange as indicated at 42. The inner race 45 surrounds the outer end of the tubular member 37 and is secured thereon by means of a nut 47 cooperating with the screw threads 38, a thrust washer 48 being disposed between the nut and the inner race, and a lock washer 49 being provided to maintain the nut 47 in adjusted position upon the member 37. Antifriction rollers 50 are disposed between the outer race 40 and the inner race 45, and these races are so beveled or tapered that the axes of diametrically opposite rollers converge on the axis of the tubular member 37 at a point adjacent to the center of the spider 27.

Loosely positioned within the transverse aperture 32 is a steel block 55 provided with four screw threaded bores positioned at right angles to each other and coaxial with the axes of the extensions 38, as indicated at 57. This block is in the form of a flat circular disk having flattened areas on its circumferential surface surrounding the bores 57 and a thickness somewhat less than the thickness of the hub portion 29 of the spider 27. A bolt as indicated at 60, extends through each of the tubular members 37 and is provided at one end thereof with a head 62 having a hexagonal portion 63 and a tapered portion 64 and at the other end with a screw threaded portion 65 adapted to cooperate with the screw threads in the bores 57 in the block 55. From an inspection of Figs. 2 and 3, it will be observed that the tapered portions 64 of the bolt heads 62 bear against the beveled outer ends of the tubular members 37 and that, as the bolts are turned into the bores 57 by means of the hexagonal portion 63 of the heads these bolts thrust the tubular members 37 inwardly and hold them rigidly in the spider member. The tubular members 37 are slightly tapered, being somewhat larger at their outer ends than at their inner ends so that when the bolts 60 are tightened the tubular members are firmly wedged in the bores with their inner ends slightly clear of the circumferential surface of the block 55.

As explained above, the block 55 fits loosely in the aperture 32 and it will be observed that the portion of the bolt between the screw threaded end and the head 62 is reduced so that the bolt is somewhat smaller than the bore of the tubular member 37. A slot or groove 66 is provided between the tapered portion of the bolt and the end of the member 37 and spaces 67 are provided between the inner ends of the tubular members and the block, thus providing a free passage for lubricant from the center of the block 55 through the tubular member 37, and into the spaces surrounding the antifriction bearings. It will be observed that the ends of the extensions 30 fit closely against the inner sides of the legs of the yokes to provide a seal between the spider and the yoke to retain the lubricant in the bearing. Exteriorly each of the apertures, as indicated at 16 and 17, is enclosed by a cup-shaped member 70 provided with an axial flange 71 fitting within the aperture and a radial flange 72 provided with spaced apertures about a circumference thereof through which stud bolts 74 extend into the respective leg of the yoke to firmly secure the plate upon the yoke. This plate completes the seal to prevent the loss of lubricant from the bearing. The aperture 32 is closed at each end thereof by means of a flat plate, as indicated at 77 and 78. Each of these plates is larger in circumference than the aperture and is secured to the hub of the spider by means of stud bolts 80 passing through spaced apertures in the plate and into screw threaded apertures provided in the hub of the spider, the plates 77 and 78 being preferably provided with depressed portions as indicated at 81 which fit within the aperture 32 and serve to position the plate relative to the aperture. A thick, felt washer, as indicated at 85, is preferably interposed between each of the plates 77 and 78 and the adjacent face of the block 55. The block 55 is also provided with a transverse aperture 82 which forms a reservoir for lubricant, and one of the plates 77 or 78 is provided centrally thereof with a grease fitting 83 by means of which lubricant may be forced into the reservoir 82.

A pressed and peened-in plate 87 is provided in that end of the aperture in the sleeve 22 adjacent to the yoke 25 to provide a grease tight closure for this aperture, and a flexible boot or sleeve member 90 is provided between the end of the sleeve 22 opposite the yoke 25 and the shaft C. This flexible boot may be secured to the sleeve by means of an annular groove in the sleeve adjacent to the end thereof and a wire ring 92 surrounding the groove outside of the flexible member and compressing a portion thereof into the groove. The flexible member is secured to the shaft C by means of a flanged fitting 94 secured upon the shaft by means of through bolts 95 and provided with a groove into which a wire ring 97 compresses a portion of the flexible member 90. This construction provides a grease tight seal between the shaft C and the sleeve 22. A thick felt disk or washer 98 is interposed in the bore 23 between the plate 87 and the adjacent end of the driven shaft C to provide a reservoir for absorbing oil and feeding the oil continuously to the relatively movable surfaces of the sleeve 22 and driven shaft C.

In assembling the device, the spider 27 is first located in position within one of the yokes 10 or 25. The corresponding antifriction bearings are then located in the apertures in the legs of the yoke, and the corresponding tubular members 37 are inserted through the antifriction bearings and into the bores of the corresponding extensions 30. At this point, the thrust washers 48 and nuts 47 may be loosely positioned upon the end of the tubular members. The block 55 is then located in the aperture 32, and the bolts 60 are inserted through the tubular members 37 and screwed into the proper screw threaded apertures 57 in the block 55 and are then tightened to force the tapered tubular members into firm wedging relation in the bores of the spider extensions. The nuts 47 may then be adjusted to properly tension the antifriction bearings and after this is done the grease plates 70 may be secured upon the yoke. Also, the felts 85 should be inserted and the grease plates 77 and 78 should at this point be secured in position upon the hub 29 of the spider 27. The universal joint is now operatively connected to one of the yokes. The other yoke is now placed in position upon the spider and the corresponding parts are assembled in the manner described above.

If, for any reason, one of the tubular members 37 need be removed, this may be accomplished by first removing the screws 60 from the member to be removed and from the member diametrically opposite it, then placing a disk into the hub recess of the spider against the inner end of the member to be removed, and a drift pin through the diametrically opposite tubular member, and driving the member out by striking the drift pin. By removing all four of the tubes in this manner, the device can readily be completely disassembled.

It will be noted that by means of the construction described, and particularly by reason of the construction of the antifriction bearings, the centrifugal force due to rotation of the shafts B and C, which tends to spread the legs of the yokes 10 and 25 apart, comes directly upon the antifriction bearings, compressing the bearings thrustwise, the bolts 60 resisting an outward movement of the bearings, and these bearings and bolts effectively restrain the legs of the yokes from spreading due to the centrifugal forces set up, thereby preventing any looseness in the bearings and preventing any separation of the yokes from the spider member to permit a leakage of lubricant therebetween. It will be further observed that the construction described provides for an exceptionally strong and rigid joint and for unusually easy assembly and disassembly of such a joint and also provides for complete adjustment of all moving parts, so that the universal joint constructed in accordance with this invention can always be maintained in perfect adjustment and any wear can readily be taken up. The construction also provides for a thorough and constant lubrication of all the moving parts of the joint.

While I have illustrated and described a particular mechanical embodiment of the idea of my invention, it is to be understood that the invention is not limited thereto and that such changes in the size, shape, and arrangement of parts may be resorted to as come within the scope of the appended claims.

Having now described my invention so that others skilled in the art may clearly understand the same, what I desire to secure by Letters Patent is as follows:

1. In a universal joint, a pair of yokes disposed at right angles to each other, a spider, means comprising tubular members extending through said yokes and into said spider, bolts extending through said tubular members having heads bearing against the outer ends of said tubular members and screw threaded inner ends anchored in said spider for rigidly securing said tubular members to said spider, antifriction bearings between the outer ends of said tubular members and said yokes disposed with their axes of thrust inclined outwardly toward the radii of the tubular members to operatively connect said yokes together for frictionless angular movement relative to each other, and means on the outer ends of said tubular members for adjusting said bearings.

2. In a universal joint a pair of yokes disposed at right angles to each other, a spider having a centrally located transverse aperture therethrough, means comprising tubular members extending through said yokes and into said spider, bolts extending through said tubular members having heads bearing against the outer ends of said tubular members and screw threaded inner ends, and a block having screw threaded apertures therein for receiving the screw threaded inner ends of said bolts positioned in said aperture in said spider for rigidly securing said tubular members to said spider, and antifriction roller bearings between the outer ends of said tubular members and said yokes to firmly connect said yokes together for frictionless angular movement relative to each other.

3. In a universal joint, a pair of yokes disposed at right angles to each other, a spider having transverse central apertures therethrough, means comprising tubular members extending through said yokes into said spider, bolts extending through said tubular members having heads bearing against the outer ends of said tubular members and screw threaded inner ends, a block having screw threaded apertures to receive the screw threaded inner ends of said bolts positioned in the aperture in said spider for rigidly securing said tubular members to said spider, antifriction roller bearings between the outer ends of said tubular members and said yokes for operatively connecting said yokes together for frictionless angular movement relative to each other, and passageways between said block and said spider and between said bolts and said tubular members so that lubricant can flow from the central portion of said spider to said bearings.

4. In a universal joint, a pair of yokes disposed at right angles to each other, a spider having transverse central apertures therethrough, means comprising tubular members extending through said yokes into said spider, bolts extending through said tubular members having heads bearing against the outer ends of said tubular members and screw threaded inner ends, a block having screw threaded apertures to receive the screw threaded inner ends of said bolts positioned in the aperture in said spider for operatively securing said tubular members to said spider, antifriction roller bearings between the outer ends of said tubular members and said yokes for rigidly connecting said yokes together for frictionless angular movement relative to each other, passageways between said block and said spider and between said bolts and said tubular members so that lubricant can flow from the central portion of said spider to said bearings, and a transverse aperture in said block to provide a reservoir for lubricant so that lubricant may be stored in said reservoir and flow from said reservoir to said bearings.

5. In a universal joint, a pair of yokes disposed at right angles to each other, a spider having four radial arms provided with openings extending therethrough, tapered tubular members extending through said yokes and wedgedly fitting in said respective openings to hold the tubular members against vibration in the arms, bolts extending through said tubular members for securing the same in place and to take up wear, anti-friction roller bearings between said tubular members and yokes with the axes of thrust inclined radially outward to firmly couple said yokes together for frictionless angular movement relative to one another, and means carried by the outer ends of said tubular members for adjusting said bearings.

CHARLES DE LOS RICE.